US006434201B1

(12) United States Patent
Ohno

(10) Patent No.: US 6,434,201 B1
(45) Date of Patent: Aug. 13, 2002

(54) SIMPLY-CONSTRUCTED DIGITAL RADIO COMMUNICATION SYSTEM CAPABLE OF CHANGING TRANSMISSION CAPACITY MODE

(75) Inventor: Katsumaru Ohno, Tokyo (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/260,534

(22) Filed: Mar. 2, 1999

(30) Foreign Application Priority Data

Mar. 2, 1998 (JP) .......................................... 10-049291

(51) Int. Cl.[7] ................................................ H04B 15/00

(52) U.S. Cl. ........................ 375/285; 375/225; 375/248

(58) Field of Search ................................ 375/285, 225, 375/240, 219, 220, 221, 317; 370/333, 231

(56) References Cited

U.S. PATENT DOCUMENTS 5,479,447 A * 12/1995 Chow et al. ................ 375/260
6,215,827 B1 * 4/2001 Balachandran et al. ..... 375/262

FOREIGN PATENT DOCUMENTS

| | | |
|---|---|---|
| EP | 0 651 531 A2 | 5/1995 |
| JP | 57-159148 | 10/1982 |
| JP | 3-13145 | 1/1991 |
| JP | 03-283743 | 12/1991 |
| JP | 6-26356 | 4/1994 |
| JP | 06-188945 | 7/1994 |
| JP | 08-84162 | 3/1996 |
| JP | 09-83600 | 3/1997 |
| JP | 9-261143 | 10/1997 |
| JP | 9-512672 | 12/1997 |

* cited by examiner

*Primary Examiner*—Mohammad H. Ghayour
(74) *Attorney, Agent, or Firm*—Sughrue Mion, PLLC

(57) ABSTRACT

In a digital radio communication system for wireless bidirectional communication between a master station and a slave station, each of the master station and the slave station includes a antenna, a subscriber interface, a first signal processing circuit for converting a first continuous data signal from the subscriber interface into a first burst digital signal and allocating it to a first predetermined time slot, a single modulation circuit for modulating the output signal of the first signal processing circuit and transmitting a modulated signal to the antenna, a single demodulation circuit for demodulating a signal from the antenna and generating a second burst digital signal; and a second signal processing circuit for converting a demodulated signal of a second predetermined time slot into a second continuous data signal and transmitting it to the subscriber interface. Also, the master station further includes a bit error rate monitoring circuit for monitoring a bit error rate in the demodulated signal, a master transmission capacity mode control circuit for controlling a transmission capacity mode of the master station in accordance with the bit error rate, and a transmission capacity mode multiplexing circuit for multiplexing the transmission capacity mode of the master station onto the first digital signal. Further, the slave station includes a transmission capacity mode demultiplexing circuit for extracting the transmission capacity mode of the master station and a slave transmission capacity mode control circuit for controlling a transmission capacity mode of the slave station in accordance with the transmission capacity mode of the master station.

8 Claims, 17 Drawing Sheets

| TRANSMISSION CAPACITY MODE | TRANSMISSION CAPACITY | EFFECTIVE DATA CHANNELS | FIXED DATA CHANNELS | NUMBER OF QUANTIZATION LEVELS | THRESHOLD VOLTAGES |
|---|---|---|---|---|---|
| M1 | 256kbps×10 | $I_1, I_2, I_3, I_4$ $Q_1, Q_2, Q_3, Q_4$ | — | 16 | $V_{th1}(1)$ $\sim V_{th1}(15)$ |
| M2 | 192kbps×10 | $I_1, I_2, I_3$ $Q_1, Q_2, Q_3,$ | $I_4$ $Q_4$ | 8 | $V_{th2}(1)$ $\sim V_{th2}(7)$ |
| M3 | 128kbps×10 | $I_1, I_2$ $Q_1, Q_2$ | $I_3, I_4$ $Q_3, Q_4$ | 4 | $V_{th3}(1)$ $\sim V_{th3}(3)$ |
| M4 | 64kbps×10 | $I_1$ $Q_1$ | $I_2, I_3, I_4$ $Q_2, Q_3, Q_4$ | 2 | $V_{th4}$ |

SIMPLY-CONSTRUCTED DIGITAL RADIO COMMUNICATION SYSTEM CAPABLE OF CHANGING TRANSMISSION CAPACITY MODE

BACKGROUND OF THE INVENTION

1. Field of the Invention

The present invention relates to a digital radio communication system capable of changing a transmission capacity mode in accordance with a bit error rate.

2. Description of the Related Art

Generally, in a digital radio communication system, bit errors often occur due to fading or the like. If a bit error rate (BER) is increased, the data transmission rate is reduced to decrease the bit error rate.

In short, when the bit error rate rises beyond a permissible level, it will be no longer possible to accurately transmit information. Therefore, various techniques have been proposed to date in an attempt to improve the modulation system and the error correction method in order to reduce data against degradation due to errors when the bit error rate is raised. Additionally, various data protection features have been developed to protect data from errors.

However, no method has been developed to date that can perfectly prevent bit errors from occurring and correct errors contained in data. Therefore, there is a strong need for a system that can efficiently and accurately detect any change in the bit error rate and adopt an adequate transmission rate that can appropriately cope with the detected bit error rate.

In a first prior art digital radio communication system where a quadrature amplitude modulation (QAM) system is used (see JP-A-3-13145), the current level of modulation is switched to a lower level when the number of input signals is smaller than a predetermined number of signals.

In the above-mentioned first prior art digital radio communication system, however, a plurality of modulation circuits and a plurality of demodulation circuits are required, which makes the system complex. Also, since the modulation level is changed only when the number of signals to be transmitted-is changed, the degradation of the line quality of the transmission path cannot be compensated for.

In a second prior art digital radio communication system (see JP-A-6-26356), a large capacity modulation circuit (demodulation circuit) and a small capacity modulation circuit (demodulation circuit) are provided on both the transmission side and the reception side, the large capacity modulation circuit (demodulation circuit) and the small capacity modulation circuit (demodulation circuit) are selected in accordance with the line quality.

Even in the above-mentioned second prior art digital radio communication system, a plurality of modulation circuits and a plurality of demodulation circuits are required, which makes the system complex.

Furthermore, with any of the above-mentioned prior art digital radio communication systems, a switching command is not issued simultaneously to the stations that are communicating with each other but the switching control operation has to be initiated individually for each of the stations. As a result, since the current modulation/demodulation system itself has to be switched to another, the time consumed before the signal transmission is resumed after the switching operation will be enormous.

SUMMARY OF THE INVENTION

It is an object of the present invention to provide a simply-constructed digital radio communication system capable of changing a transmission capacity mode for compensating for the degradation of the line quality.

Another object is to be able to simultaneously carry out the switching operation of transmission capacity modes in a plurality of stations.

According to the present invention, in a digital radio communication system for wireless bidirectional communication between a master station and a slave station, each of the master station and the slave station includes an antenna, a subscriber interface, a first signal processing circuit for converting a first continuous data signal from the subscriber interface into a first burst digital signal and allocating it to a first predetermined time slot, a single modulation circuit for modulating the output signal of the signal processing circuit and transmitting a modulated signal to the antenna demodulation circuit for demodulating a signal from the antenna and generating a second burst signal, and a second signal processing circuit for converting the second burst digital signal of a second predetermined time slot into a second continuous data signal and transmitting it to the subscriber interface. Also, the master station further includes a bit error rate monitoring circuit for monitoring a bit error rate in the demodulated signal a master transmission capacity mode control circuit for controlling a transmission capacity mode of the master station in accordance with the bit error rate, and a transmission capacity mode multiplexing circuit for multiplexing the transmission capacity mode of the master station onto the first digital signals. Further, the slave station includes a transmission capacity mode demultiplexing circuit for extracting the transmission capacity mode of the master station, and a slave transmission capacity mode control circuit for controlling a transmission capacity mode of the slave station in accordance with the transmission capacity mode of the master station.

Thus, since each station includes a single modulation circuit, the system can be simply constructed.

Also, a delay circuit is connected between the transmission capacity mode determining circuit and the master transmission capacity mode control circuit, thus simultaneously changing the transmission capacity mode in the master station and the slave station.

BRIEF DESCRIPTION OF THE DRAWINGS

The present invention will be more clearly understood from the description set forth below, with reference to the accompanying drawings, wherein:

FIG. 3 is a table showing the content of the transmission capacity mode storing memory of FIG. 1;

DESCRIPTION OF THE PREFERRED EMBODIMENT

Figures 1, 1A:
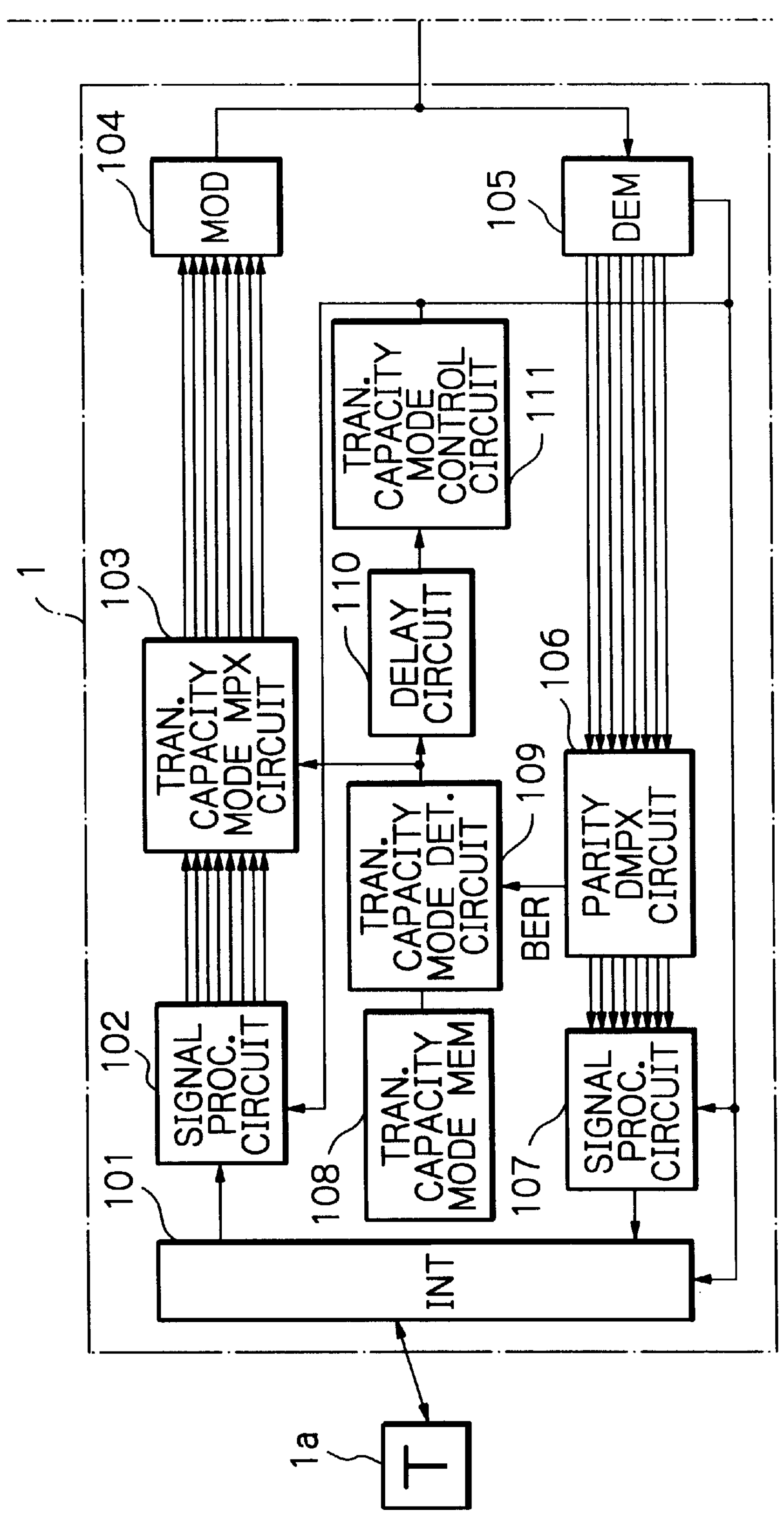
FIGS. 1A and 1B are a block circuit diagram illustrating a QAM radio communication system according to the present invention.
Figure 1B:
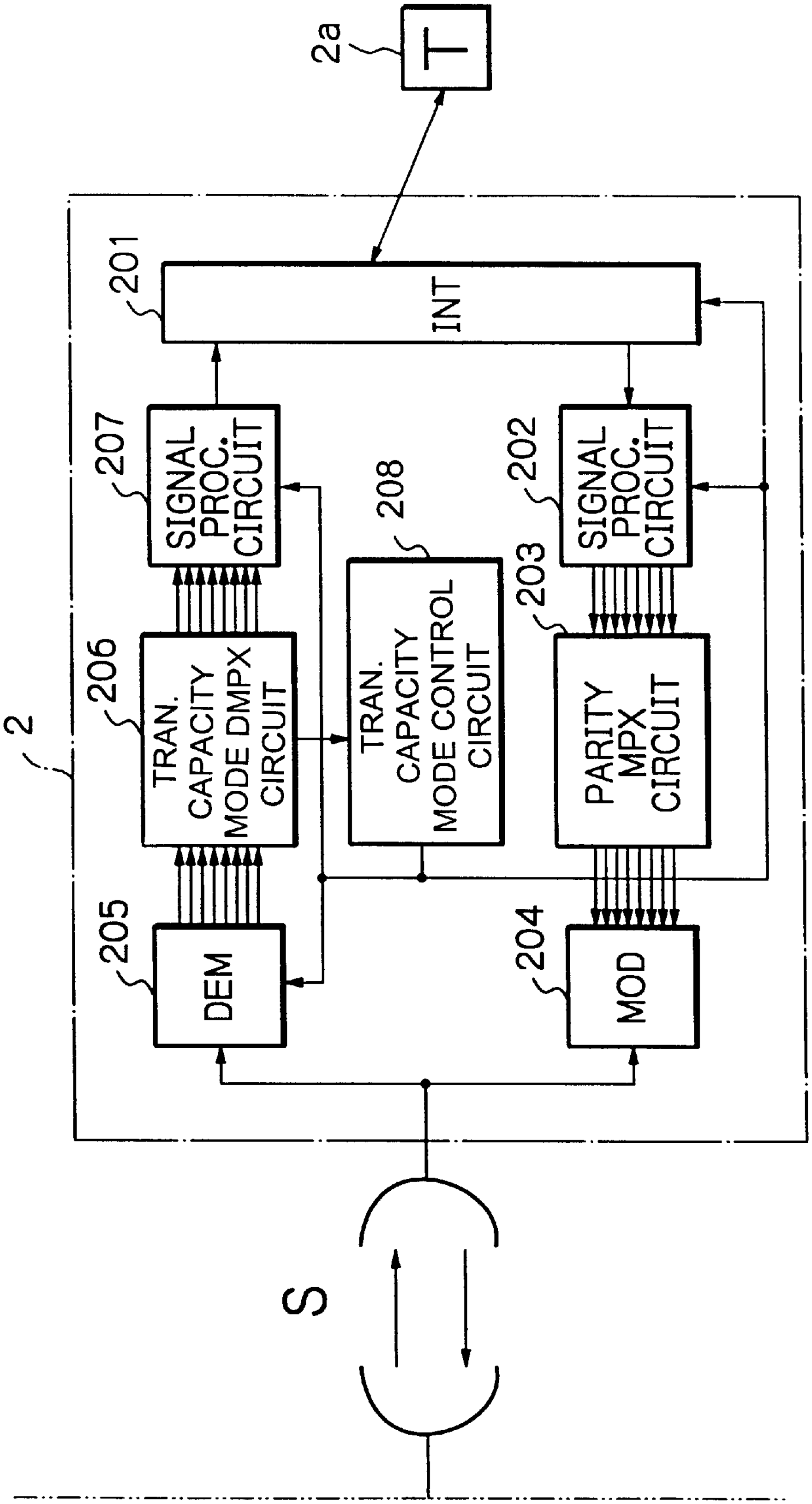

In FIG. 1, which illustrates a QAM radio communication system, a master station 1 and a slave station 2 are provided to adapt to wireless bidirectional communication for exchanging digital information. That is, the bit error rate BER of transmission signals S is constantly monitored, and the transmission capacity of the transmission signals S is automatically changed in accordance with the monitored bit error rate BER.

A plurality of terminals such as a terminal 1*a* are connected to the master station 1, and the plurality of terminals such as a terminal 2*a* are connected to the slave station 2.

The master station 1 is constructed by a subscriber interface 101 connected to the terminal 1*a*, a signal processing circuit 102 for converting a continuous data signal from the terminal 1*a* into a burst data signal and allocating it to a predetermined time slot on a time division basis, a transmission capacity mode multiplexing circuit 103, and a modulation circuit 104 for modulating the data signal of the signal processing circuit 102 and transmitting the modulated signal to the slave station 2.

Also, the master station 1 is constructed by a demodulation circuit 105 for receiving a signal S from the slave station 2 and demodulating the signal S, a parity demultiplexing circuit 106 for extracting a parity signal from the demodulated signal, and a signal processing circuit 107 for converting the demodulated signal into a burst data signal, converting it into a continuous data signal and transmitting it to the subscriber interface 101 which outputs the continuous data signal to the terminal 1*a*. Note that the parity demultiplexing circuit 106 determines whether or not a bit error is generated in accordance with the extracted parity signal, and calculates a bit error rate BER in accordance with the generation of bit errors. Further, the master station 1 is constructed by a transmission capacity mode storing memory (table) 108 for storing a plurality of transmission capacity modes, a transmission capacity mode determining circuit 109 for determining an optimum transmission capacity mode, a delay circuit 110, and a transmission capacity control circuit 111. That is, the transmission capacity mode storing memory 108 stores a plurality of transmission capacity modes in advance. The transmission capacity mode determining circuit 109 determines an optimum transmission capacity mode selected from the transmission capacity modes stored in the transmission capacity mode storing memory 108 in accordance with the bit error rate BER. Also, the optimum transmission capacity mode is transmitted via the delay circuit 110 to the transmission capacity control circuit 111 for controlling the transmission capacity rode of the master station 1 and is transmitted to the transmission capacity mode multiplexing circuit 103 for controlling the transmission capacity mode of the slave station 2. The delay circuit 110 is provided to delay the operation of the transmission capacity control circuit 111. As a result, when a transition of transmission capacity modes occurs in the master station 1, such a transition of transmission capacity modes simultaneously occurs in the slave station 2.

On the other hand, the slave station 2 is constructed by a subscriber interface 201 connected to the terminal 2*a*, a signal processing circuit 202 for converting a continuous data signal from the terminal 2*a* into a burst data signal and allocating it to a predetermined time slot, a parity multiplexing circuit 203, and a modulation circuit 204 for modulating the data signal of the signal processing circuit 202 and transmitting the modulated signal to the master station 1. The parity multiplexing circuit 203 calculates a parity of the data signal and multiplexes this parity with the data signal.

Also, the slave station 2 is constructed by a demodulation circuit 205 for receiving a signal S from the master station 1 and demodulating the signal S, a transmission capacity mode demultiplexing circuit 206 for extracting the optimum transmission capacity mode from the demodulated signal, and a signal processing circuit 207 for converting the demodulated signal into a burst signal, converting it into a continuous data signal and transmitting it to the subscriber interface 201 which outputs the continuous data signal to the terminal 2*a*.

Further, the slave station 2 is constructed by a transmission capacity control circuit 208 for receiving the optimum transmission capacity mode from the transmission capacity mode demultiplexing circuit 206.

The transmission capacity mode control circuit 111 of the master station 1 and the transmission capacity mode control circuit 208 of the slave station 2 are both operated by the transmission capacity mode determining circuit 109 of the master station 1. In this case, due to the presence of the delay circuit 110, the operation of the transmission capacity mode control circuit 111 is synchronized with one of the transmission capacity mode control circuit 208.

In the master station 1, the transmission capacity control circuit 111 controls the conversion format of the signal processing circuit 102, the clock rate of a clock signal supplied from the subscriber interface 101 to the terminal 1*a*, the conversion format of the signal processing circuit 107, the quantization levels and threshold voltages of the demodulation circuit 105. Similarly, in the slave station 2, the transmission capacity control circuit 208 controls the clock rate of a clock signal supplied from the subscriber interface 101 to the terminal 2*a*, the conversion format of the signal processing circuit 207, and the quantization levels and threshold voltages of the demodulation circuit 205.

Figure 2A:
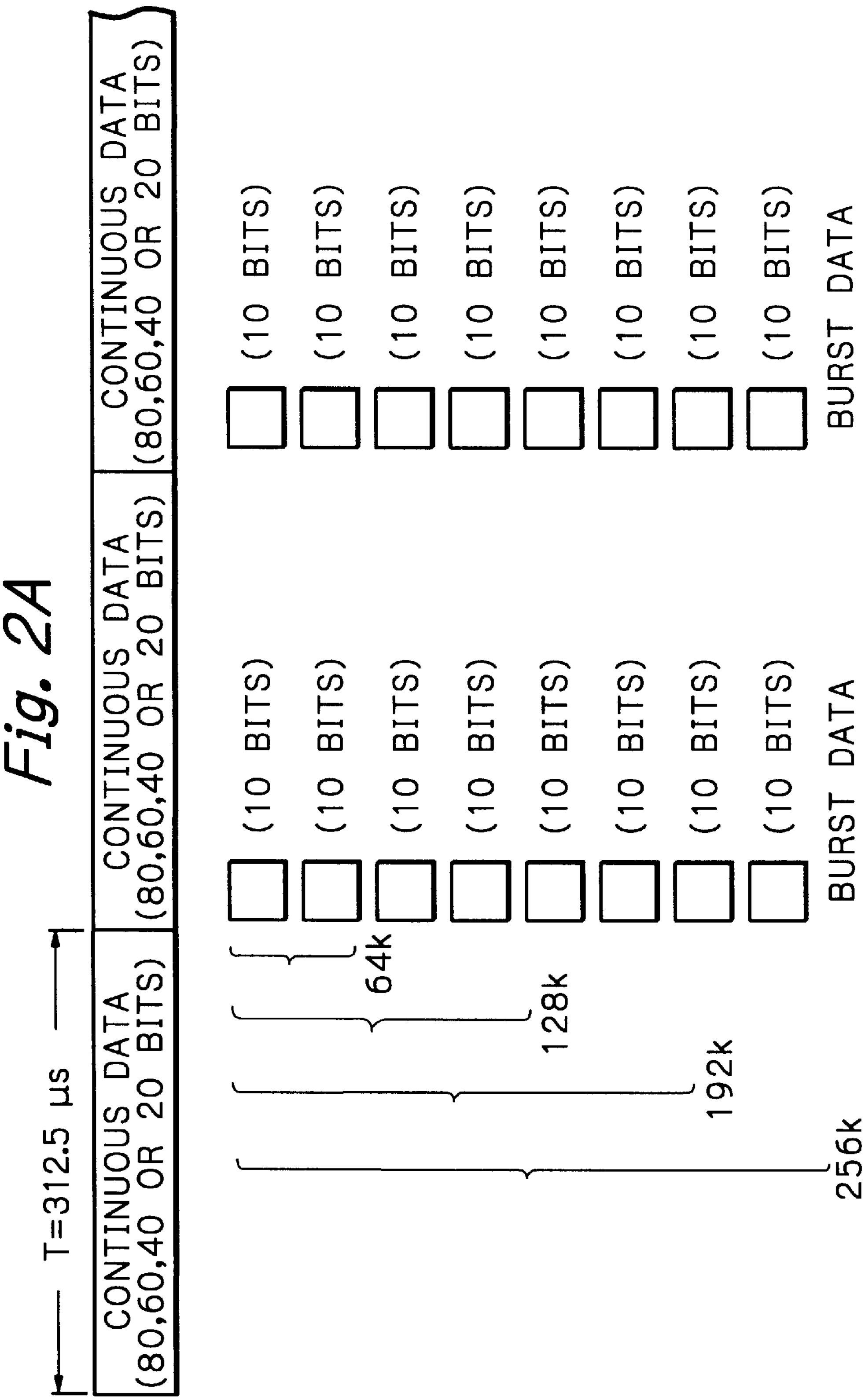
FIG. 2A is a timing diagram showing the continuous data signal and the burst data signal of FIG. 1.

As shown in FIG. 2A, the continuous data signal from the subscriber interface 101 or 201 is constructed by 80, 60, 40 or 20 bits per a predetermined time period T such as 312.5 μs, if the clock rate of the terminals 1*a* and 2*a* is 256 k, 192 k, 128 k or 64 k. Therefore, the burst data signal is 10 bits×8 in the clock rate of 256 k, 10 bits×6 in the clock rate of 192 k, 10 bits×4 in the clock rate of 128 k and 10 bits×2 in the clock rate of 64 k.

Figure 2B:
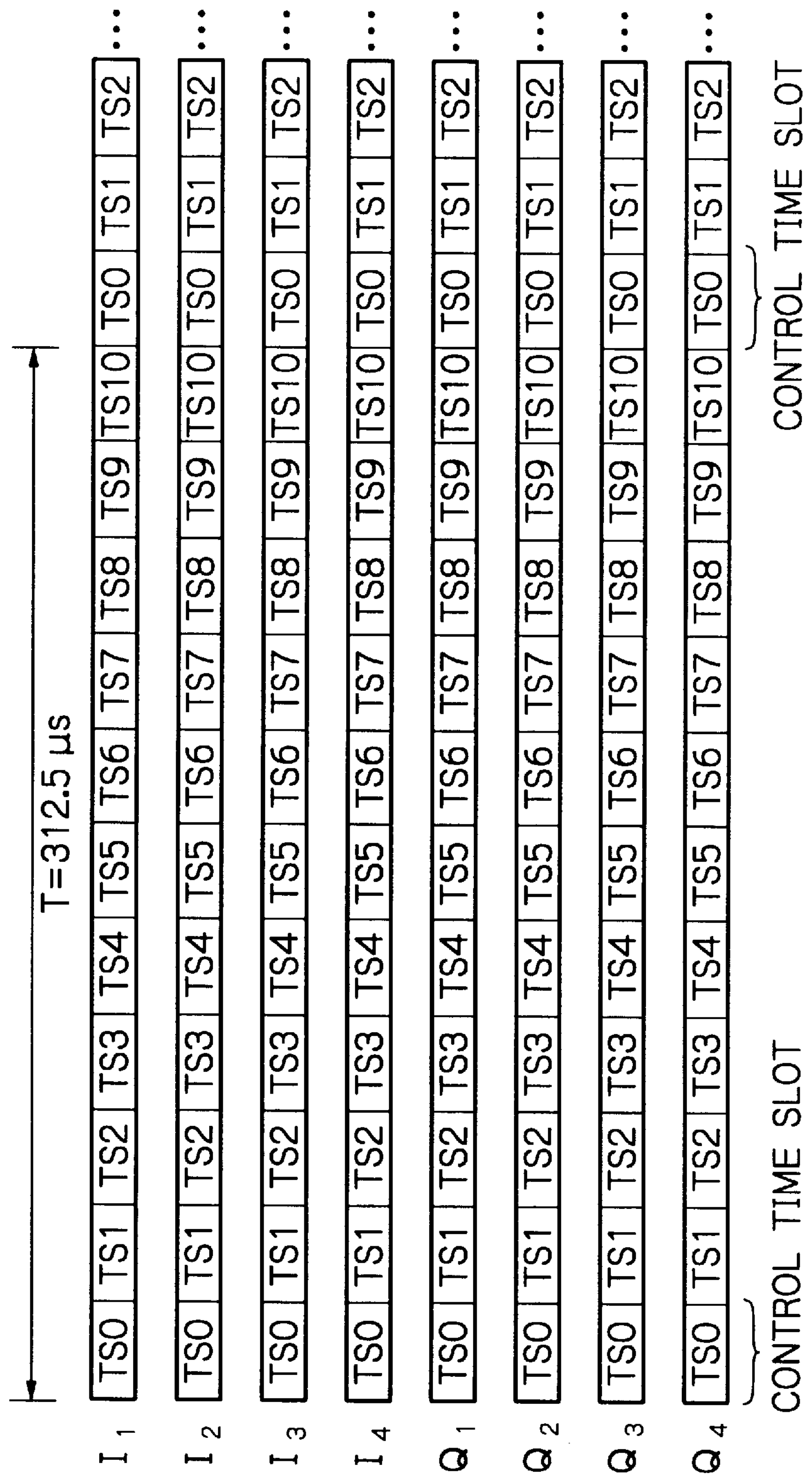
FIG. 2B is a timing diagram showing a frame format used in the system of FIG. 1.

A time-divisional multiplex radio frame format as shown in FIG. 2B is used as the transmission signal S of FIG. 1. This radio frame format is formed by four data channels $I_1$, $I_2$, $I_3$ and $I_4$ in the I-axis direction and four data channels $Q_1$, $Q_2$, $Q_3$ and $Q_4$ in the Q-axis direction. Each of the data channels is constructed by frames with the predetermined time period T, each of the frames having a control time slot TS0 for multiplexing control data such as an optimum transmission capacity mode and time slots TS1 to TS10 to be allocated to terminals such as the terminals 1*a* and 2*a*, whichever appropriate, on a time-division basis.

Figure 2C:
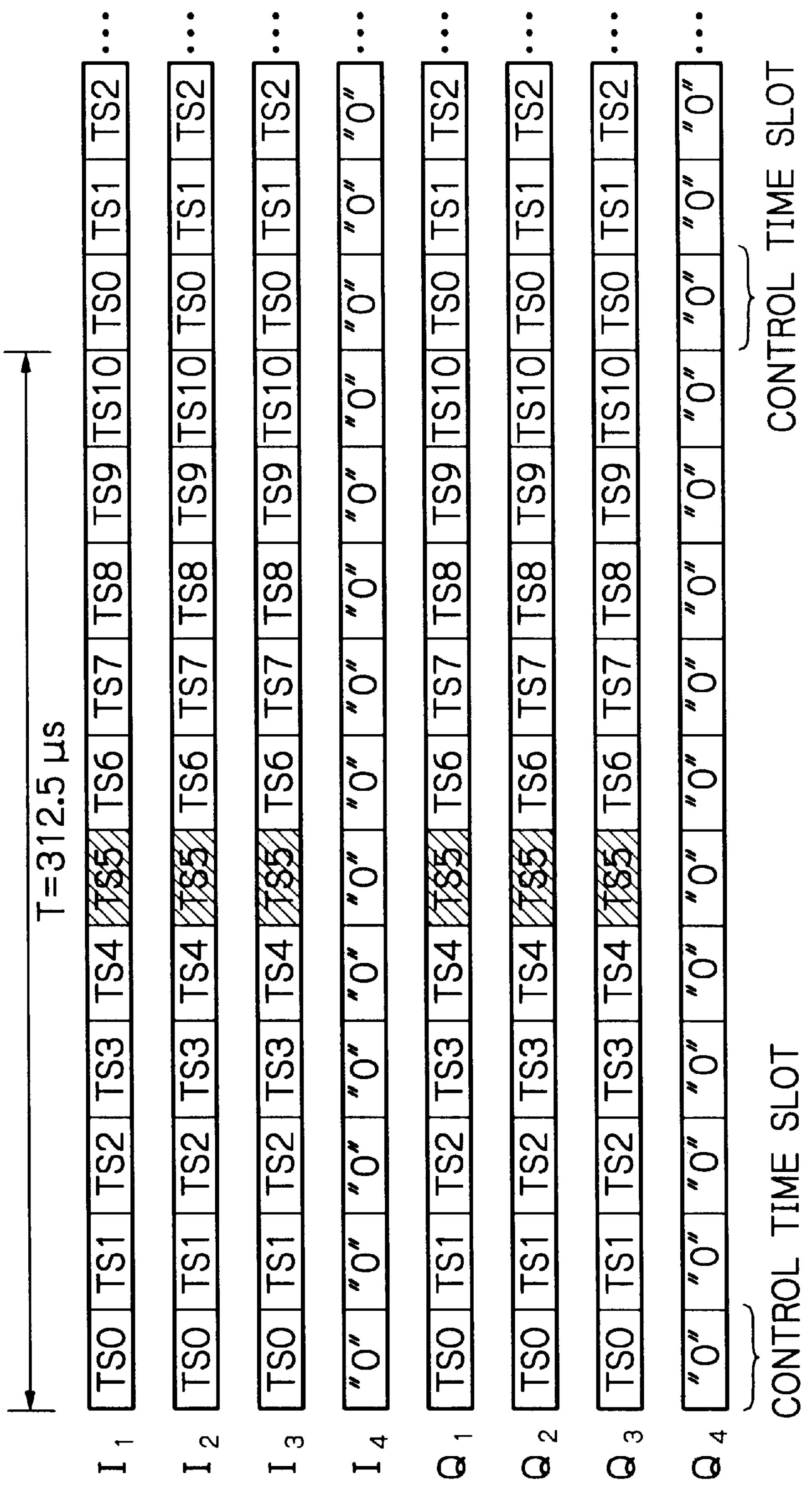
FIG. 2C is a timing diagram showing the operation of the signal processing circuit of FIG. 1

For example, as shown in FIG. 2C, if the clock rate is 192 k, the signal processing circuit 102 (202) allocates the burst data signal to the data channels $I_1$, $I_2$, $I_3$, $Q_1$, $Q_2$, and $Q_3$ of a time slot TS5 while the data channels $I_4$ and $Q_4$ are fixed at 0.

Note that the operation of the signal processing circuit 107 (207) is opposite to that of the signal processing circuit 101 (201).

The transmission capacity mode storing memory 108 stores four transmission capacity modes M1, M2, M3 and M4.

Figure 4A:
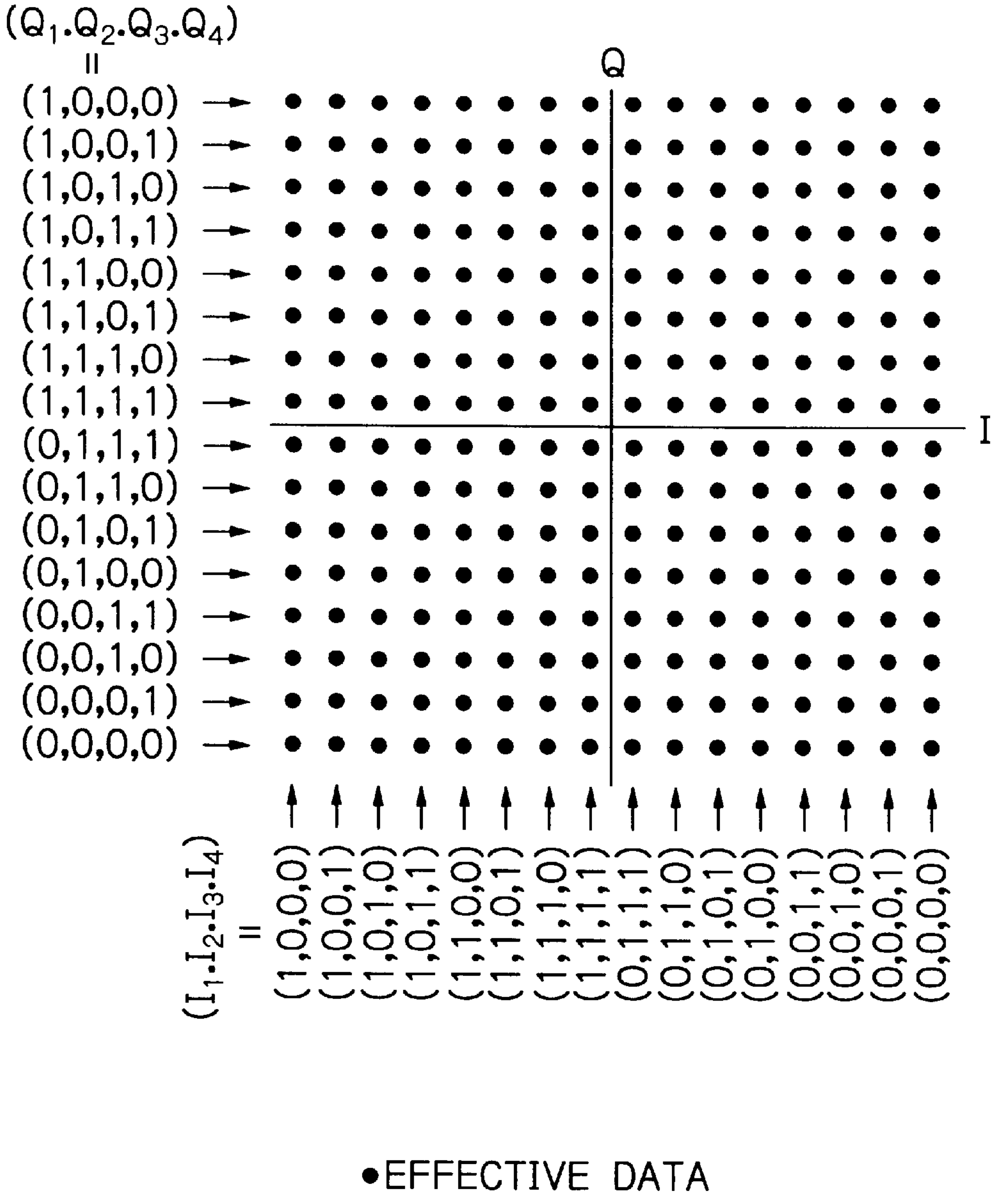
FIG. 4A is a diagram illustrating a constellation of the transmission capacity mode M1 of FIG. 3.
Figure 4B:
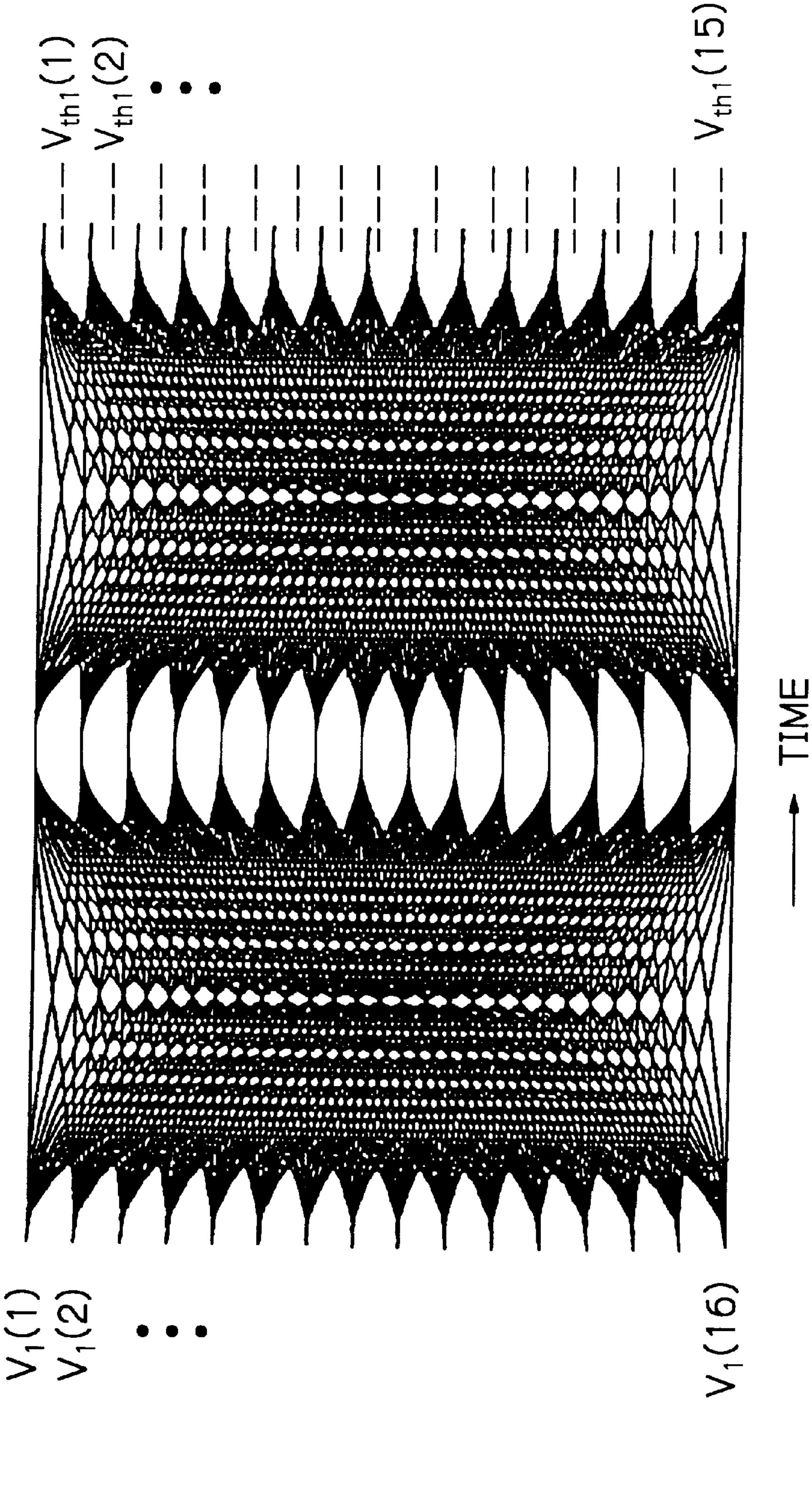
FIG. 4B is an eye pattern diagram of the transmission capacity mode M1 of FIG. 3.

The transmission capacity mode M1 corresponds to a 256 QAM system whose constellation pattern is illustrated in FIG. 4A. That is, the transmission capacity, i.e., the clock rate of the terminals 1*a* and 2*a* is 256 k, and the data channels $I_1$, $I_2$, $I_3$, $I_4$, $Q_1$, $Q_2$, $Q_3$, and $Q_4$, are effective while no data channel is fixed. Also, in this case, eye pattern waveforms in the demodulation circuit 105(205) are as illustrated in FIG. 4B. That is, the number of quantization levels is 16, i.e., the quantization levels are $V_1(1), V_1(2), \ldots,$ and $V_1(16)$ Therefore, the threshold voltages for discriminating the quantization levels $V_1(1)$, $V_1(2)$, . . . , and $V_1(16)$ are $V_{th1}(1), V_{th1}(2), \ldots,$ and $V_{th1}(15)$ where $V_1(i+1)<V_{th1}(i)<V_1(i)$.

Figure 5A:
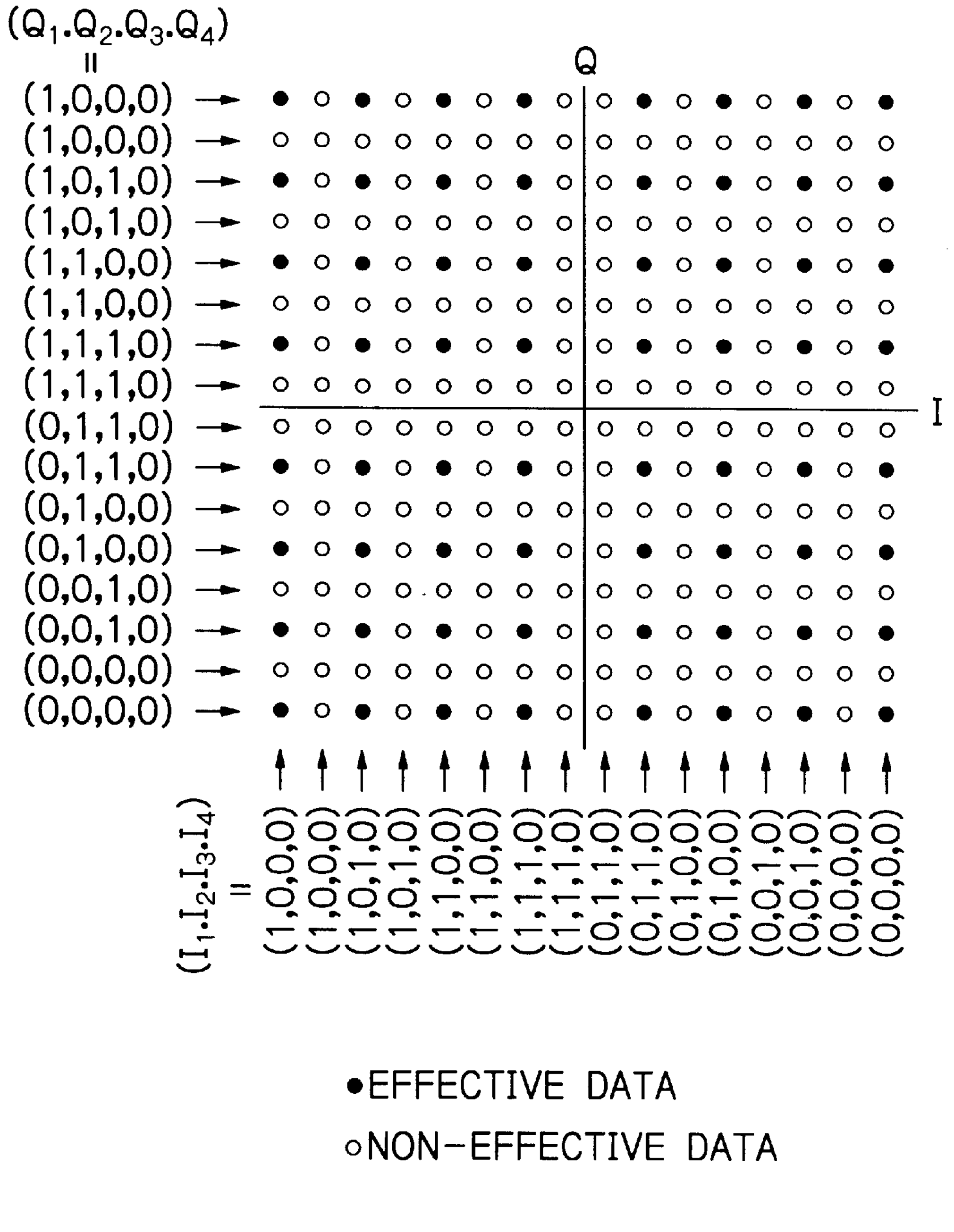
FIG. 5A is a diagram illustrating a constellation of the transmission capacity mode M2 of FIG. 3.
Figure 5B:
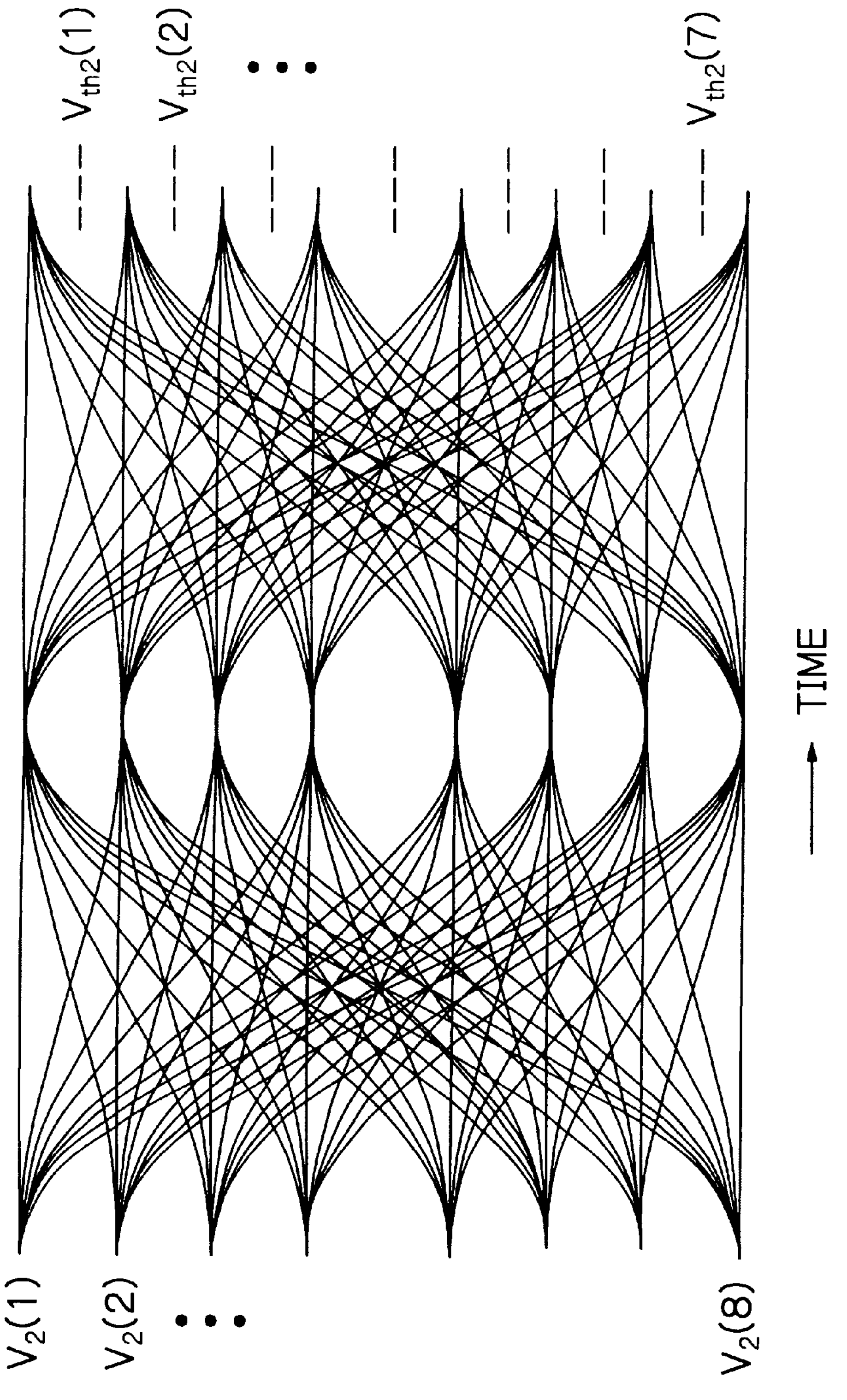
FIG. 5B is an eye pattern diagram of the transmission capacity mode M2 of FIG. 3.

The transmission capacity mode M2 corresponds to a 64 QAM system whose constellation pattern is illustrated in FIG. 5A. That is, the transmission capacity, i.e., the clock rate of the terminals 1*a* and 2*a* is 192 k, and the data channels $I_1$, $I_2$, $I_{3,\ Q1}$, $Q_2$, and $Q_3$ are effective while the data channels $I_4$ and $Q_4$ are fixed at 0. Also, in this case, eye pattern waveforms in the demodulation circuit 105(205) are as illustrated in FIG. 5B. That is, the number of quantization levels is 8, i.e., the quantization levels are $V_2(1), V_2(2), \ldots,$ and $V_2(8)$ Therefore, the threshold voltages for discriminating the quantization levels $V_2(1)$, $V_2(2)$, . . . , and $V_2(8)$ are $Vth_2(1), V_{th2}(2), \ldots,$ and $V_{th2}(7)$ where $V_2(i+1)<V_{th2}(i)<V_2(i)$.

Figure 6A:
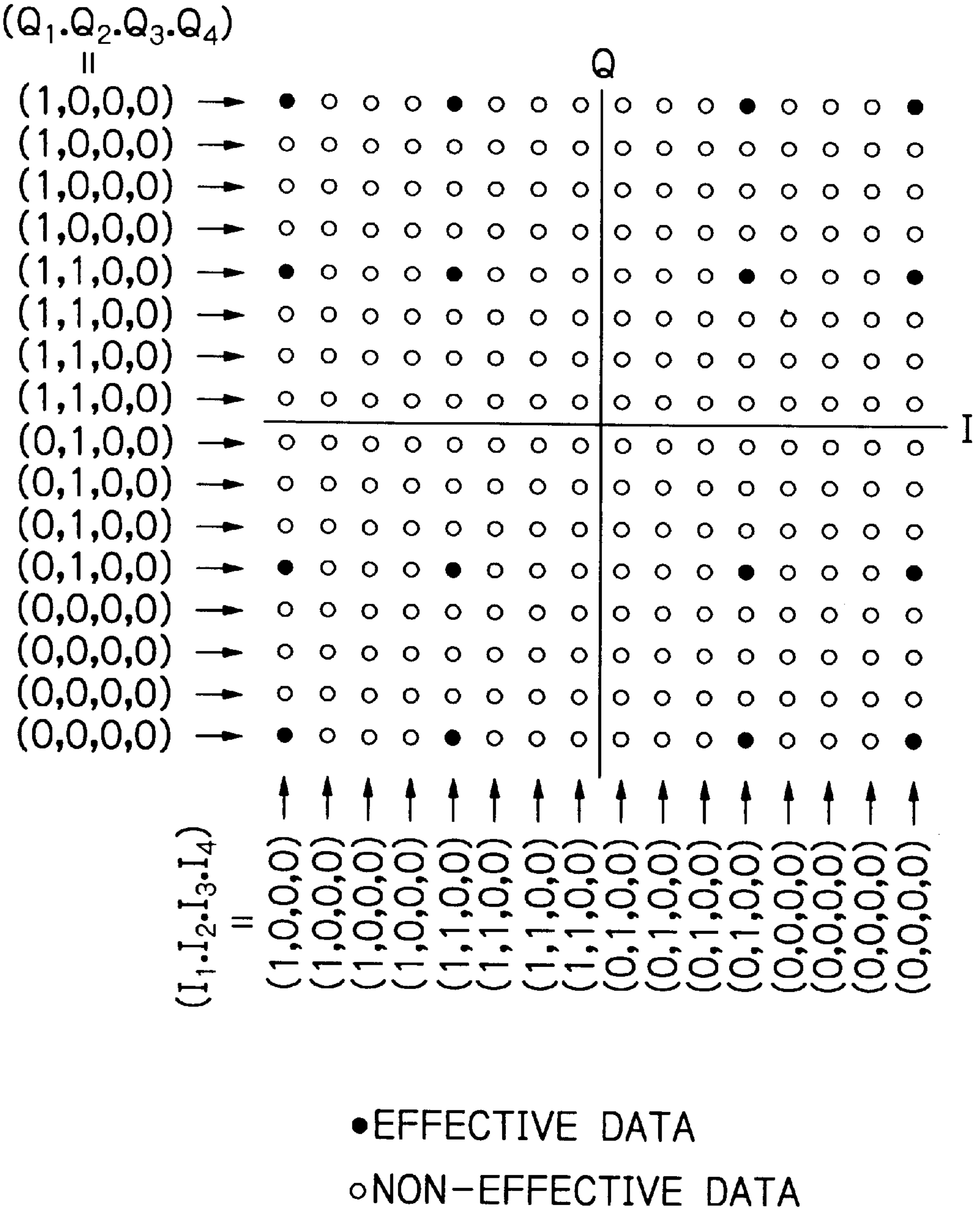
FIG. 6A is a diagram illustrating a constellation of the transmission capacity mode M3 of FIG. 3.
Figure 6B:
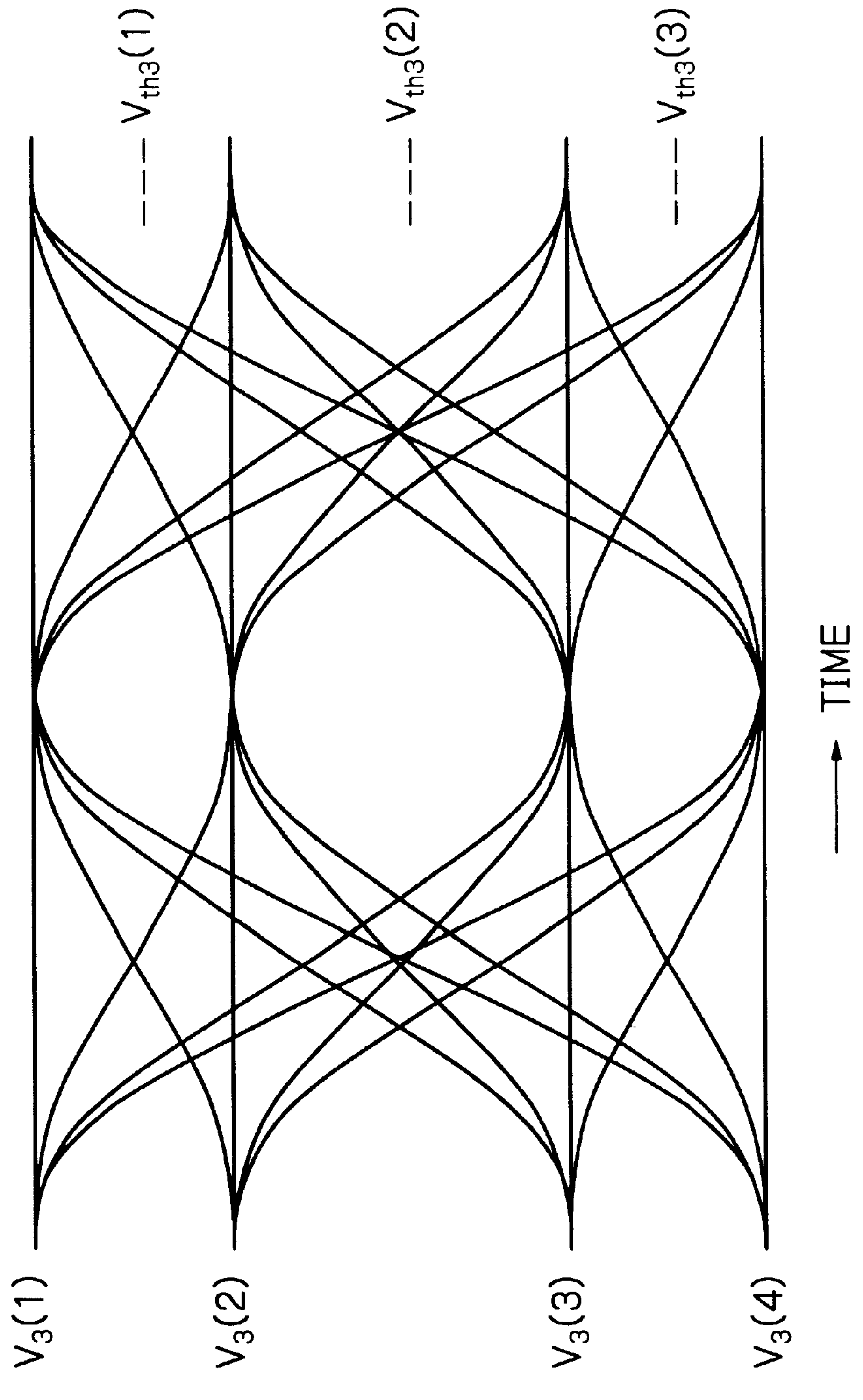
FIG. 6B is an eye pattern diagram of the transmission capacity mode M3 of FIG. 3.

The transmission capacity mode M3 corresponds to a 16 QAM system whose constellation pattern is illustrated in FIG. 6A. That is, the transmission capacity, i.e., the clock rate of the terminals 1*a* and 2*a* is 128 k, and the data channels $I_1$, $I_2$, $Q_1$, and $Q_2$ are effective while the data channels $I_3$, $I_4$, $Q_3$ and $Q_4$ are fixed at 0. Also, in this case, eye pattern waveforms in the demodulation circuit 105(205) are as illustrated in FIG. 6B. That is, the number of quantization levels is 4, i.e., the quantization levels are $V_3(1), V_3(2), V(3)$ and $V_3(4)$ Therefore, the threshold voltages for discriminating the quantization levels $V_3(1)$, $V_3(2)$ $V_3(3)$ and $V_3(4)$ are $V_{th3}(1), V_{th3}(2),$ and $V_{th3}(3)$ where $V_3(i+1)<V_{th3}(i)<V_3(i)$.

Figure 7A:
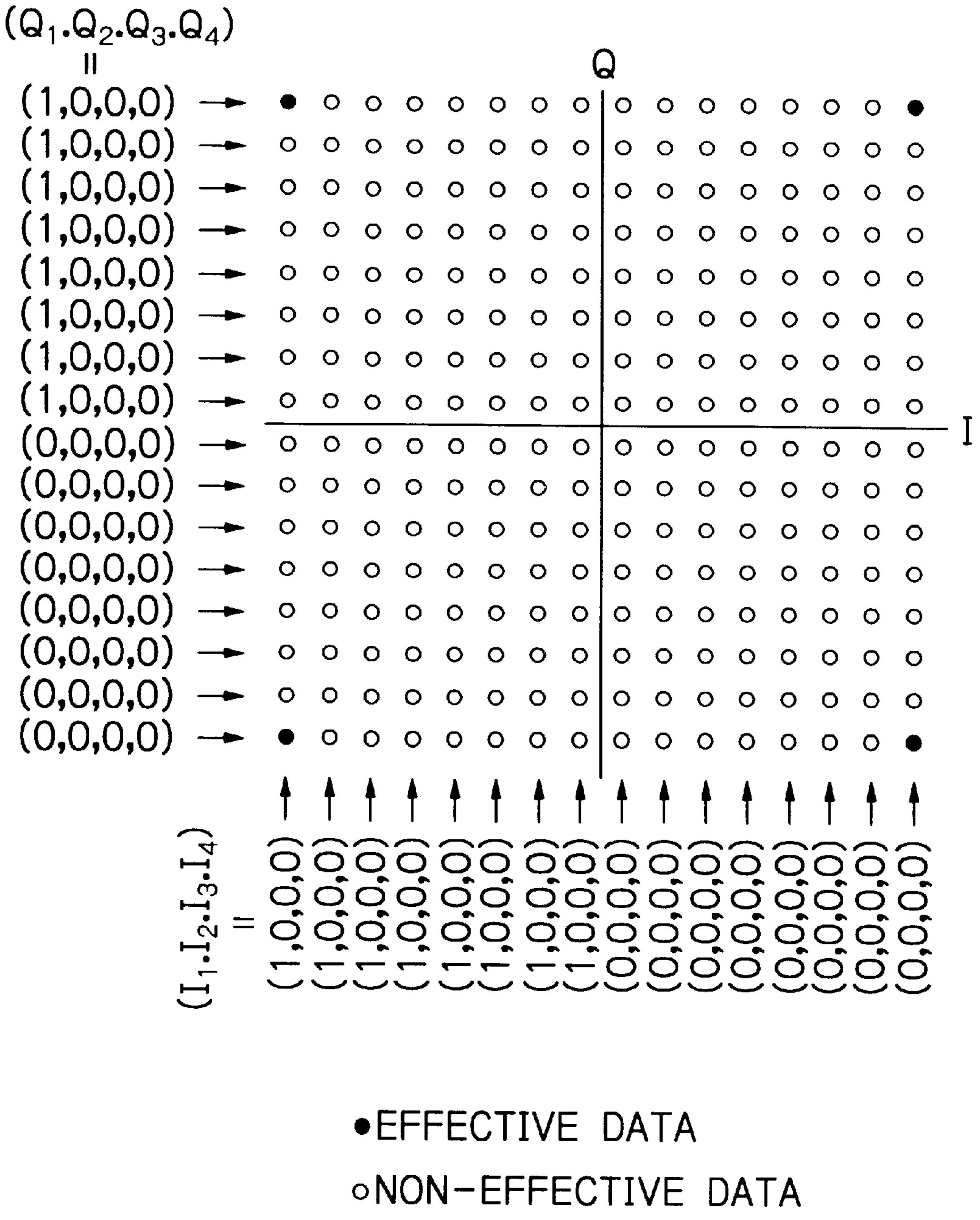
FIG. 7A is a diagram illustrating a constellation of the transmission capacity mode M4 of FIG. 3.
Figure 7B:
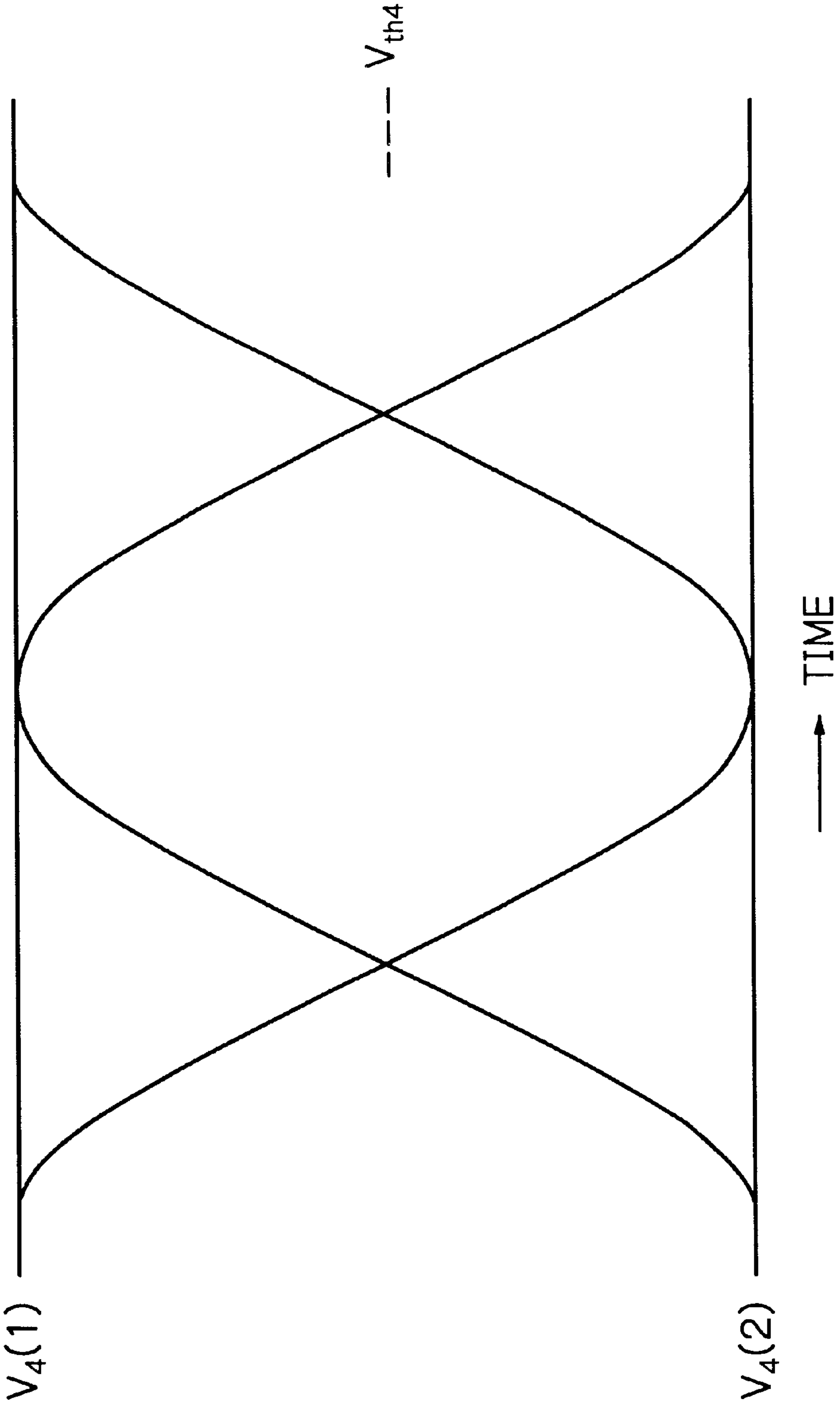
FIG. 7B is an eye pattern diagram of the transmission capacity mode M4 of FIG. 3.

The transmission capacity node M4 corresponds to a 4 QAM system whose constellation pattern is illustrated in FIG. 7A. That is, the transmission capacity, i.e., the clock rate of the terminals 1*a* and 2*a* is 64 k, and the data channels $I_1$ and $Q_1$ are effective while the data channels $I_2$, $I_3$, $I_4$, $Q_2$, $Q_3$ and $Q_4$ fixed at 0. Also, in this case, eye pattern waveforms in the demodulation circuit 105(205) are as illustrated in FIG. 7B. That is, the number of quantization levels is 2, i.e., the quantization levels are $V_4(1)$ and $V_4(2)$ Therefore, the threshold voltages for discriminating the quantization levels $V_4(1)$ and $V_4(2)$ are $V_{th4}$ where $V_4(2)<V_{th4}<V_4(1)$.

Figure 8:
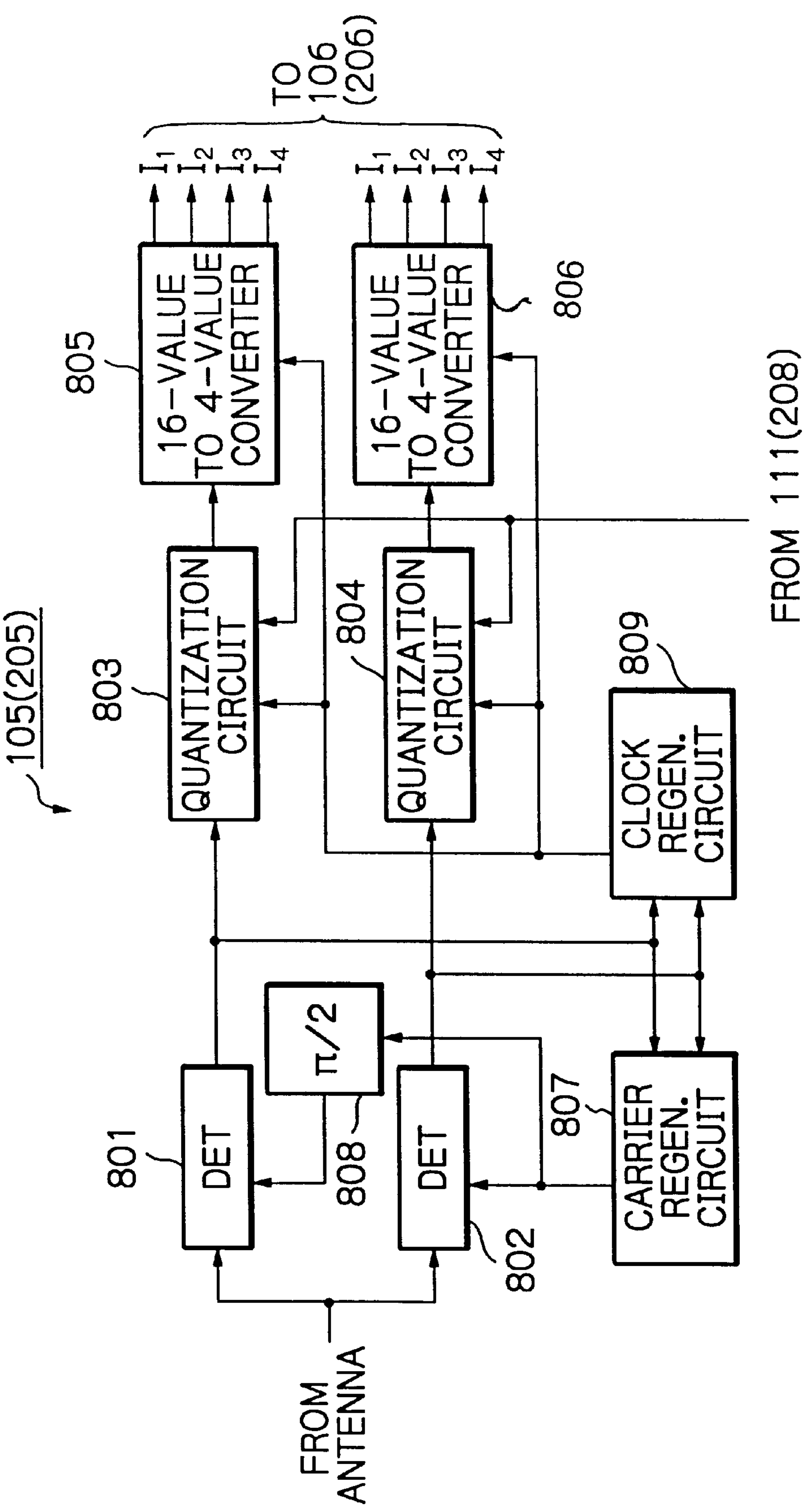
FIG. 8 is a detailed block circuit diagram of the demodulation circuit of FIG. 1.

In FIGS. 4B, 5B, 6B and 7B, $V_1(1)=V_2(1)=V_3(1)=V_4(1)$ $V_1(3)=V_2(2)$ $V_1(5)=V_2(3)=V_3(2)$ $V_1(7)=V_2(4)$ $V_1(10)=V_2(5)$ $V_1(12)=V_2(6)=V_3(3)$ $V_1(14)=V_2(7)$ $V_1(16)=V_2(8)=V_3(4)=V_4(2)$ In FIG. 8, which is a detailed circuit diagram of the demodulation circuit 105(205) of FIG. 1, the demodulation circuit 105(205) is constructed by a detection circuit (mixer) 801 for detecting an I-axis component of a received signal and a detection circuit (mixer) 802 for detecting a Q-axis component of the received signal. Also, the analog output signals of the detection circuits 801 and 802 are supplied to an I-axis quantization circuit 803 and a Q-axis quantization circuit 804, respectively. Further, the quantized output signals of the quantization circuits 803 and 804 are supplied to an I-axis 16-value to 4-value converter 805 for generating I-axis components $I_1$, $I_2$, $I_3$, and $I_4$ and a Q-axis 16-value to 4-value converter 806 for generating Q-axis components $Q_1$, $Q_2$, $Q_3$, and $Q_4$, respectively.

A carrier regenerating circuit 807 is connected to the I-axis detection circuit 801 and the Q-axis detection circuit 802 to regenerate a carrier signal. The regenerated carrier signal is supplied directly to the Q-axis detection circuit 802, so that the received signal is mixed with the regenerated carrier signal. On the other hand, the regenerated carrier signal is supplied via a $\pi/2$ phase shifter 808 to the I-axis detection circuit 801, so that the received signal is mixed with a carrier signal orthogonal to the regenerated carrier signal.

A clock regenerating circuit 809 is also connected to the I-axis detection circuit 801 and the Q-axis detection circuit 802, to regenerate a clock signal for controlling the I-axis quantization circuit 803, the Q-axis quantization circuit 804, the I-axis 16-value to 4-value converter 805 and the Q-axis 16-value to 4-value converter 806.

Figure 9:
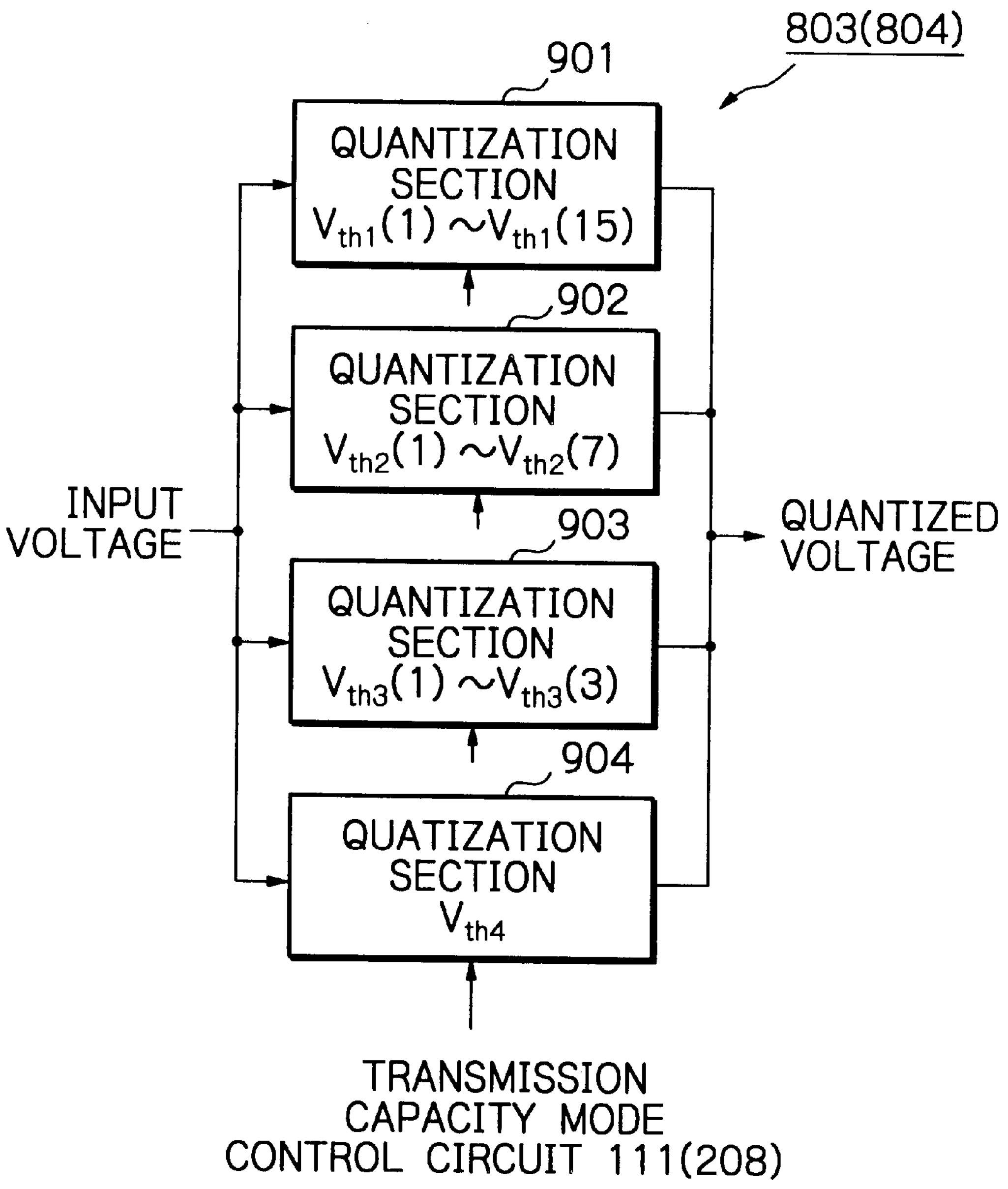
FIG. 9 is a detailed circuit diagram of the quantization circuit of FIG. 8.

In FIG. 9, which is a detailed circuit diagram of the quantization circuit 803 (804) of FIG. 8, the quantization circuit 803 (804) is constructed by four quantization sections 901, 902, 903 and 904 for the transmission capacity modes M1, M2, M3 and M4, respectively. In this case, one of the quantization sections 901, 902, 903 and 904 is selected by the transmission capacity mode control circuit 111 (208).

The quantization section 901 is constructed by a sample/hold circuit for sampling/holding an input signal in response to the regenerated clock signal, 15 comparators for comparing the output voltage of the sample/hold circuit with the threshold voltages $V_{th1}(1)$, $V_{th1}(2)$, . . . and $V_{th1}(15)$, and a logic circuit connected to the comparators for generating a quantized voltage $V_1(1)$, $V_1(2)$, . . . , or $V_1(16)$.

The quantization section 902 is constructed by a sample/hold circuit for sampling/holding an input signal in response to the regenerated clock signal, 7 comparators for comparing the output voltage of the sample/hold circuit with the threshold voltages $V_{th2}(1)$, $V_{th2}(2)$, . . . , and $V_{th2}(7)$, and a logic circuit connected to the comparators for generating a quantized voltage $V_2(1)$, $V_2(2)$, . . . , or $V_2(8)$.

The quantization section 903 is constructed by a sample/hold circuit for sampling/holding an input signal in response to the regenerated clock signal, 3 comparators for comparing the output voltage of the sample/hold circuit with the threshold voltages $V_{th3}(1)$, $V_{th3}(2)$, and $V_{th3}(3)$, and a logic circuit connected to the comparators for generating a quantized voltage $V_3(1)$, $V_3(2)$, $V_3(3)$ or $V_3(4)$.

The quantization section 904 is constructed by a sample/hold circuit for sampling/holding an input signal in response to the regenerated clock signal, a comparator for comparing the output voltage of the sample/hold circuit with the threshold voltage $V_{th4}$, and a logic circuit connected to the comparator for generating a quantized voltage $V_4(1)$ or $V_4(2)$.

In FIGS. 4B, 5B, 6B and 7B, each of the threshold voltages is set at a center value between the two corresponding quantized voltages of an eye pattern opening. As a result, the margin of the operation of the comparators of the quantization circuit 803 (804) can be enlarged considerably to consequently decrease the probability of erroneously determining the quantized voltages for the detected data, thus improving the demodulation characteristics.

The flow of a signal from the terminal 2*a* of the slave station 2 to the terminal 1*a* of the master station 1 in the system of FIG. 1 will be explained next.

The terminal 2*a* transmits continuous data in synchronization with the clock signal supplied from the subscriber interface 201. In this case, the clock rate of this clock signal is defined by the transmission capacity mode determined by the transmission capacity mode determining circuit 109 of the master station 1. The subscriber interface 201 converts the continuous data received from the terminal 2*a* of the slave station 2 into a digital signal format.

Next, the signal processing circuit 202 converts the continuous digital data into a burst data signal as shown in FIG. 2A, and multiplexes the divided digital data onto radio frames allocated to the terminal 2*a* on a time-division basis as shown in FIGS. 2B and 2C.

Next, the parity multiplexing circuit 203 calculates a parity of the multiplexed data and multiplexes the parity thereonto.

Next, the modulation circuit 204 modulates the multiplexed data and transmits it to the master station 1 via the antennas.

Next, the demodulation circuit 105 demodulates a received signal from the slave station 2. Then, the parity demultiplexing circuit 106 extracts the parity from the demodulated signal and calculates a bit error rate BER that is transmitted to the transmission capacity mode determining circuit 109.

Then, the signal processing circuit 107 converts the demodulated signal of the radio frame format into continuous digital data, which is then transmitted to the subscriber interface 101.

The subscriber interface 101 converts the continuous digital data into the continuous signal format of the terminal 1*a*.

Finally, the terminal 1*a* receives data from the subscriber interface 101 in synchronization with the clock signal supplied from the subscriber interface 101. In this case, the clock rate of this clock signal is defined by the transmission capacity mode determined by the transmission capacity mode determining circuit 109.

The flow of a signal from the terminal 1*a* of the master station 1 to the terminal 2*a* of the slave station 2 in the system of FIG. 1 will be explained next.

The terminal 1*a* transmits continuous data in synchronization with the clock signal supplied from the subscriber interface 101 The subscriber interface 101 converts the continuous data received from the terminal 1*a* of the master station 1 into a digital signal format.

Next, the signal processing circuit 102 converts the continuous digital data into a burst data signal as shown in FIG. 2A, and multiplexes the divided digital data onto radio frames allocated to the terminal 1*a* on a time-division basis as shown in FIGS. 2B and 2C.

Next, the transmission capacity mode multiplexing circuit 103 receives a transmission capacity mode from the transmission capacity mode determining circuit 109 and multiplexes the transmission capacity mode onto the time slots TS0 of the radio frames.

Next, the modulation circuit 104 modulates the multiplexed data and transmits it to the slave station 2 via the antennas.

Next, the demodulation circuit 205 demodulates a received signal from the master station 2. Then, the transmission capacity mode demultiplexing circuit 206 extracts the transmission capacity mode from the time slots TS0 of the demodulated signal and then, the transmission capacity mode is transmitted to the transmission capacity mode control circuit 208.

Then, the signal processing circuit 207 converts the demodulated signal of the radio frame format into continuous digital data, which is then transmitted to the subscriber interface 201.

The subscriber interface 201 converts the continuous digital data into the continuous signal format of the terminal 2*a*.

Finally, the terminal 2*a* receives data from the subscriber interface 201 in synchronization with the clock signal supplied from the subscriber interface 201.

The operation of changing the transmission capacity mode will be explained next with reference to FIG. 10.

First, at steps 1001 and 1002, the bit error rate BER calculated by the parity demultiplexing circuit 106 is monitored by the transmission capacity mode determining circuit 109. In more detail, at step 1001, it is determined whether or not BER is larger than a definite value $\alpha$ so that the quality of the communication line is downgraded. On the other hand, at step 1002, it is determined whether or not BER is smaller than a definite value $\beta(<\alpha)$ so that the quality of the communication line is upgraded. As a result, if $BER>\alpha$, then the control proceeds to step 1003 which increments a value "j" by 1. On the other hand, if $BER<\beta$, then the control proceeds to step 1006 which decrements the value "j" by 1. Note that the value "j" represents the transmission capacity mode Mj.

At steps 1004 and 1005, the value "j" is guarded by the minimum value 4. That is, at step 1004, if the value "j" is 2, 3 or 4, the control proceeds to step 1009. If the value "i" is 5, the control proceeds to step 1005 which causes the value "j" to be 4 and then, the control proceeds to step 1010.

On the other hand, at steps 1007 and 1008, the value "j" is guarded by the minimum value 1. That is, at step 1007, if the value "j" is 1, 2 or 3, the control proceeds to step 1009. If the value "j" is 0, the control proceeds to step 1008 which causes the value "j" to be 1 and then, the control proceeds to step 1010.

At step 1009, the transmission capacity mode is changed, i.e., a new transmission capacity mode is set up for the system of FIG. 1. That is, the transmission capacity mode determining circuit 109 multiplexes the new transmission capacity mode onto the control time slots TS0 of the radio frames, so that the new transmission capacity mode is set into the transmission capacity mode control circuit 208 of the slave station 2 via the transmission capacity mode demultiplexing circuit 206 thereof. On the other hand, in the master station 1, the new transmission capacity mode is maintained in the delay circuit 110 for a predetermined time period in order for the new transmission capacity mode to be switched at the master station 1 and the slave station 2 simultaneously.

Figure 10:
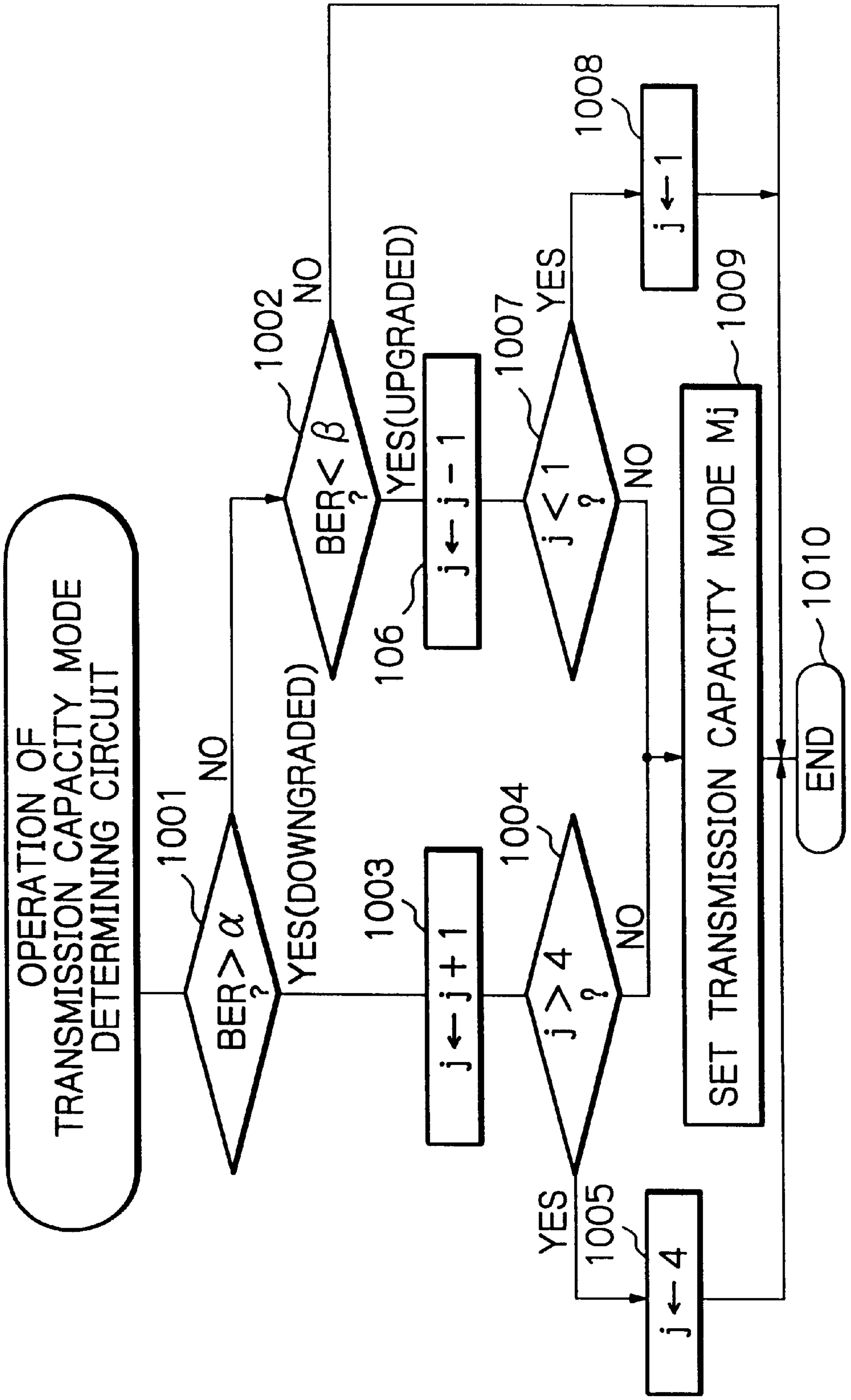
FIG. 10 is a flowchart for explaining the operation of the transmission capacity mode determining circuit of FIG. 1.

Then, the control proceeds to step 1010, thus completing the routine of FIG. 10.

Thus, the new transmission capacity mode will be started both at the master station 1 and the slave station 2 simultaneously.

For example, if the new transmission capacity mode is the transmission capacity mode M1, in the master station 1, the transmission capacity mode control circuit 111 sets the clock rate of the clock signal supplied to the terminal 1*a* to be 256 k, while no data channel is fixed at the signal processing circuit 102 and no data channel is removed at the signal processing circuit 107. Further, the quantization section 901 is selected from the quantization circuit of the demodulation circuit 105. On the other hand, in the slave station 2, the transmission capacity mode control circuit 208 sets the clock rate of the clock signal supplied to the terminal 2*a* to be 256 k, while no data channel is fixed at the signal processing circuit 202 and no data channel is removed at the signal processing circuit 207. Further, the quantization section 901 is selected from the quantization circuit of the demodulation circuit 205.

If the new transmission capacity mode is the transmission capacity mode M2, in the master station 1, the transmission capacity mode control circuit 111 sets the clock rate of the clock signal supplied to the terminal 1*a* to be 192 k, while the data channels $I_4$ and $Q_4$ are fixed at the signal processing circuit 102 and the data channels $I_4$ and $Q_4$ are removed at the signal processing circuit 107. Further, the quantization section 902 is selected from the quantization circuit of the demodulation circuit 105. On the other hand, in the slave station 2, the transmission capacity mode control circuit 208 sets the clock rate of the clock signal supplied to the terminal 2*a* to be 192 k, while the data channels $I_4$ and $Q_4$ are fixed at the signal processing circuit 202 and the data channels $I_4$ and $Q_4$ are removed at the signal processing circuit 207. Further, the quantization section 902 is selected from the quantization circuit of the demodulation circuit 205.

If the new transmission capacity mode is the transmission capacity mode M3, in the master station 1, the transmission capacity mode control circuit 111 sets the clock rate of the clock signal supplied to the terminal 1*a* to be 128 k, while the data channels $I_3$, $I_4$, $Q_3$ and $Q_4$ are fixed at the signal processing circuit 102 and the data channels $I_3$, $I_4$, $Q_3$ and $Q_4$ are removed at the signal processing circuit 107. Further, the quantization section 903 is selected from the quantization circuit of the demodulation circuit 105. On the other hand, in the slave station 2, 2, the transmission capacity mode control circuit 208 sets the clock rate of the clock signal supplied to the terminal 2*a* to be 128 k, while the data channels $I_3$, $I_4$, $Q_3$ and $Q_4$ are fixed at the signal processing circuit 202 and the data channels $I_3$, $I_4$, $Q_3$ and $Q_4$ are removed at the signal processing circuit 207. Further, the quantization section 903 is selected from the quantization circuit of the demodulation circuit 205.

If the new transmission capacity mode is the transmission capacity mode M4, in the master station 1, the transmission capacity mode control circuit 111 sets the clock rate of the clock signal supplied to the terminal 1*a* to be 64 k, while the data channels $I_2$, $I_3$, $I_4$, $Q_2$, $Q_3$ and $Q_4$ are fixed at the signal processing circuit 102 and the data channels $I_2$, $I_3$, $I_4$, $Q_2$, $Q_3$ and $Q_4$ are removed at the signal processing circuit 107. Further, the quantization section 904 is selected from the quantization circuit of the demodulation circuit 105. On the other hand, in the slave station 2, the transmission capacity mode control circuit 208 sets the clock rate of the clock signal supplied to the terminal 2*a* to be 64 k, while the data channels $I_2$, $I_3$, $I_4$, $Q_2$, $Q_3$ and $Q_4$ are fixed at the signal processing circuit 202 and the data channels $I_2$, $I_3$, $I_4$, $Q_2$, $Q_3$ and $Q_4$ are removed at the signal processing circuit 207. Further, the quantization section 904 is selected from the quantization circuit of the demodulation circuit 205.

In the above-mentioned embodiment, although the number of transmission capacity modes is four, the present invention can be applied to five or more transmission capacity modes. Also, in this case, a new transmission capacity mode can be selected by increasing the value "j" in FIG. 10 by two or more. Further, the increase or decrease of the value "j" at step 1003 or 1006 can be variable.

Also, in FIG. 9, although the quantization sections 901, 902, 903 and 904 are constructed by hardware, the quantization sections 901, 902, 903 and 904 can be constructed by using software.

As explained hereinabove, according to the present invention, since each station is constructed by a single modulation circuit and a single demodulation circuit, the degradation of the communication line quality can be compensated for by a simply constructed radio communication system.

What is claimed is:

1. A digital radio communication system for wireless bidirectional communication between a master station and a slave station, wherein each of said master station and said slave station comprises:

an antenna;

a subscriber interface;

a first signal processing circuit, connected to said subscriber interface, for converting a first continuous data signal from said subscriber interface into a first burst digital signal and allocating said first burst digital signal to a first predetermined time slot;

a single modulation circuit, connected between said first signal processing circuit and said antenna, for modulating an output signal of said first signal processing circuit and transmitting a modulated signal to said antenna;

a single demodulation circuit, connected to said antenna, for demodulating a signal from said antenna; and a second signal processing circuit, connected between said demodulation circuit and said subscriber interface, for converting a demodulated signal of a second predetermined time slot into a second continuous data signal and transmitting said second continuous data signal to said subscriber interface, said master station further comprising:

a bit error rate monitoring circuit, connected between said demodulation circuit and said second signal processing circuit of said master station, for monitoring a bit error rate in said demodulated signal;

a master transmission capacity mode control circuit connected to said bit error rate monitoring circuit, and said subscriber interface, said first and second signal processing circuits and said demodulation circuit of said master station, for controlling a transmission capacity mode of said raster station in accordance with said bit error rate; and a transmission capacity mode multiplexing circuit, connected between said first signal processing circuit and said modulation circuit of said master station, for multiplexing the transmission capacity mode of said master station onto said first burst digital signal, said slave station further comprising:

a transmission capacity mode demultiplexing circuit, connected between said demodulation circuit and said second signal processing circuit of said slave station, for extracting the transmission capacity mode of said master station;

a slave transmission capacity mode control circuit, connected to said transmission capacity mode demultiplexing circuit, and said subscriber interface, said first and second signal processing circuits and said demodulation circuit of said slave station, for controlling a transmission capacity mode of said slave station in accordance with the transmission capacity mode of said master station.

2. The system as set forth in claim 1, wherein said master station further comprises:

a transmission capacity mode storing memory for storing a plurality of transmission capacity modes; and a transmission capacity mode determining circuit, connected to said transmission capacity mode storing memory, said bit error monitoring circuit, said master transmission capacity mode control circuit and said transmission capacity mode multiplexing circuit, for selecting one of said transmission capacity modes stored in said transmission capacity mode storing memory in accordance with said bit error rate and transmitting a selected transmission capacity mode to said master transmission capacity mode control circuit and said transmission capacity mode multiplexing circuit.

3. The system as set forth in claim 2, wherein said transmission capacity mode determining circuit selects a lower level transmission capacity mode than a currently selected transmission capacity mode when said bit error rate is larger than a first value, and said transmission capacity mode determining circuit selects a higher level transmission capacity mode than a currently selected transmission capacity mode when said bit error rate is smaller than a second value smaller than said first value.

4. The system as set forth in claim 1, wherein said master station further comprises a delay circuit, connected between said transmission capacity mode determining circuit and said master transmission capacity mode control circuit.

5. The system as set forth in claim 1, wherein said slave station further comprises a parity multiplexing circuit connected between said first signal processing circuit and said modulation circuit of said slave station, for multiplexing a parity of said first burst digital signal onto said first burst digital signal, said bit error rate monitoring circuit comprising a parity demultiplexing circuit for extracting said parity and calculating said bit error rate.

6. The system as set forth in claim in claim 1, wherein said master transmission capacity mode control circuit controls a clock rate of a clock signal of said subscriber interface of said master station, conversion formats of said first and second signal processing circuits of said master station and demodulation characteristics of said demodulation circuit of said master station in accordance with said transmission capacity mode, said slave transmission capacity mode control circuit controls a clock rate of a clock signal of said subscriber interface of said slave station, conversion formats of said first and second signal processing circuits of said slave station and demodulation characteristics of said demodulation circuit of said slave station in accordance with said transmission capacity mode.

7. The system as set forth in claim 1, being a quadrature amplitude modulation system.

8. The system as set forth in claim 7, wherein said demodulation circuit comprises quantization circuits having quantized levels and threshold voltages therebetween, said master transmission capacity mode control circuit controlling a clock rate of a clock signal of said subscriber interface of said master station in accordance with said transmission mode, said master transmission capacity mode control circuit fixing data channels of said first signal processing circuit of said master station in accordance with said transmission capacity mode, said master transmission capacity mode control circuit removing fixed data channels of said second signal processing circuit of said master station in accordance with said transmission capacity mode, said master transmission capacity mode control circuit changing the quantized levels and threshold voltages of said quantization circuits of said master station in accordance with said transmission capacity mode, said slave transmission capacity mode control circuit controlling a clock rate of a clock signal of said subscriber interface of said slave station in accordance with said transmission capacity mode, said slave transmission capacity mode control circuit fixing data channels of said first signal processing circuit of said slave station in accordance with said transmission capacity mode, said slave transmission capacity mode control circuit removing fixed data channels of said second signal processing circuit of said slave station in accordance with said transmission capacity mode, said slave transmission capacity mode control circuit changing the quantized levels and threshold voltages of said quantization circuits of said slave station in accordance with said transmission capacity mode.

* * * * *

UNITED STATES PATENT AND TRADEMARK OFFICE

CERTIFICATE OF CORRECTION

PATENT NO. : 6,434,201 B1
DATED : August 13, 2002
INVENTOR(S) : Katsumaru Ohno

It is certified that error appears in the above-identified patent and that said Letters Patent is hereby corrected as shown below:

Column 3,
Line 67, delete “rode” and insert -- mode --

Column 4,
Line 51, after “terminal 2α,” insert -- the conversion format of the signal processing circuit 202, --;
Line 36, delete “$I_3$, $_{Q1}$” and insert -- -$I_3$, $Q_1$ --;
Line 44, delete “$Vth_2(1)$,” and insert -- $V_{th2}(1)$, --

Column 8,
Line 3, after “interface 101” and before “The subscriber” insert -- . --;
Line 54, delete “i” and insert -- “j” --

Column 10,
Line 66, delete “raster” and insert -- master --

Signed and Sealed this

Twenty-eighth Day of January, 2003

JAMES E. ROGAN
*Director of the United States Patent and Trademark Office*